(12) United States Patent
Asghari et al.

(10) Patent No.: US 10,637,247 B2
(45) Date of Patent: Apr. 28, 2020

(54) SYSTEM AND METHOD FOR MINIMIZING STORAGE DEMAND CHARGES BY WEIGHT ASSIGNMENTS TO DIFFERENT DEMAND CATEGORIES

(71) Applicant: NEC Laboratories America, Inc., Princeton, NJ (US)

(72) Inventors: Babak Asghari, San Jose, CA (US); Ratnesh Sharma, Fremont, CA (US); Zeyu Wang, Seattle, WA (US)

(73) Assignee: NEC Corporation (JP)

( * ) Notice: Subject to any disclaimer, the term of this patent is extended or adjusted under 35 U.S.C. 154(b) by 376 days.

(21) Appl. No.: 15/711,544

(22) Filed: Sep. 21, 2017

(65) Prior Publication Data

US 2018/0090935 A1    Mar. 29, 2018

Related U.S. Application Data

(60) Provisional application No. 62/398,540, filed on Sep. 23, 2016.

(51) Int. Cl.
*H02J 3/32* (2006.01)
*H02J 3/00* (2006.01)
(Continued)

(52) U.S. Cl.
CPC .............. *H02J 3/32* (2013.01); *G05B 19/042* (2013.01); *H02J 7/0013* (2013.01); *G05B 2219/2639* (2013.01); *H02J 3/003* (2020.01); *H02J 2003/003* (2013.01); *H02J 2003/007* (2013.01); *H02J 2203/20* (2020.01); *Y02E 60/76* (2013.01); *Y04S 40/22* (2013.01)

(58) Field of Classification Search
CPC ...... H02J 3/32; H02J 7/0013; H02J 2003/007; H02J 2003/003; G05B 19/042; G05B 2219/2639

See application file for complete search history.

(56) References Cited

U.S. PATENT DOCUMENTS

| 2005/0165520 | A1* | 7/2005 | Ariyur | ............... G05B 23/0232 702/190 |
| 2014/0074305 | A1* | 3/2014 | Dzafic | ................. H02J 13/0013 700/291 |
| 2014/0266054 | A1  | 9/2014 | Faries et al. | |

OTHER PUBLICATIONS

Ke, Bwo-Ren et al., "Sizing the Battery Energy Storage System on a University Campus with Prediction of Load and Photovoltaic Generation", IEEE Transactions on Industry Applications, Apr. 2016, pp. 1136-1147, 52(2).

(Continued)

*Primary Examiner* — Darrin D Dunn
*Assistant Examiner* — Marzia T Monty
(74) *Attorney, Agent, or Firm* — Joseph Kolodka

(57) ABSTRACT

Systems and methods for minimizing demand charges includes generating historical demand profiles having a plurality of demand charge threshold (DCT) values over a period of time, filtering the DCT values using weighting factors to provide filtered DCT values such that DCT underestimations and overestimations are removed from optimization, determining an optimal DCT output value from the filtered DCT values such that the optimal DCT output value is based on the historical demand profiles and the weighting factors, and distributing energy in one or more batteries in accordance with the optimal DCT output value and current energy demand to minimize energy and demand charges.

3 Claims, 7 Drawing Sheets

(51) Int. Cl.
*G05B 19/042* (2006.01)
*H02J 7/00* (2006.01)

(56) References Cited

OTHER PUBLICATIONS

Levron, Yoash et al., "Power systems' optimal peak-shaving applying secondary storage", Electric Power Systems Research, Aug. 2012, pp. 80-84, 89.

* cited by examiner

SYSTEM AND METHOD FOR MINIMIZING STORAGE DEMAND CHARGES BY WEIGHT ASSIGNMENTS TO DIFFERENT DEMAND CATEGORIES

RELATED APPLICATION INFORMATION

This application claims priority to Ser. No. 62/398,540, filed on Sep. 23, 2016, incorporated herein by reference in its entirety.

BACKGROUND

Technical Field

The present invention relates to management of energy storage systems, and more particularly, to management of energy storage system operations for forecasting optimal demand charge thresholds (DCTs) and minimizing peak demand charges.

Description of the Related Art

Peak demand (e.g., peak load) generally describes a period of high consumer energy demand in excess of an average supply level in which energy (e.g., power) is expected to be provided. In addition to consumption of energy charges, many utility companies charge consumers for energy based on their individual peak demand. Energy storage systems (ESSs), such as batteries, are often facilitated to aid energy management by storing energy when consumption of energy is low and supplying energy to the grid (e.g., load) when consumption and/or demand increases (e.g., during power peaks). Storing and supplying stored energy from such systems is commonly referred to as peak shaving which reduces the amount of peak charges.

A factor in peak shaving includes demand charge thresholds. A demand charge threshold (DCT) is a threshold level of energy usage in which a fee is imposed for energy consumption above the threshold level (e.g., peak usage). In Behind the Meter battery management systems, the DCT can be predetermined to assist customers, such as Commercial and Industrial (C&I) industries, in performing peak shaving. Conventional systems and methods typically select previous demand profiles as a forecast for the coming month's demand profile in an effort to estimate the DCT. However, the previous demand profile is broken down into approximately thirty daily demand profiles; each daily demand profile is then utilized to compute a single daily DCT whereby either the minimum or maximum daily DCT is selected as the DCT result.

Accordingly, conventional systems and methods select a single daily DCT value to represent the coming month's demand profile. Implementation of day-ahead profiles typically result in DCTs far from desired values and less optimal demand charge savings. Moreover, it is difficult to perfectly forecast demand profiles as they typically fluctuate due to numerous variables. Thus, these conventional systems and methods do not adequately reduce peak demand charges because, for example, the selected daily DCT value does not accurately represent the coming month's demand.

SUMMARY

According to an aspect of the present principles, a method is provided for minimizing demand charges. The method includes generating historical demand profiles having a plurality of demand charge threshold (DCT) values over a period of time, filtering the DCT values using weighting factors to provide filtered DCT values such that DCT underestimations and overestimations are removed from optimization, determining an optimal DCT output value from the filtered DCT values such that the optimal DCT output value is based on the historical demand profiles and the weighting factors, and distributing energy in one or more batteries in accordance with the optimal DCT output value and current energy demand to minimize energy and demand charges.

According to another aspect of the present principles, a system is provided for minimizing demand charges. The system includes a processor coupled to a memory, the processor being configured to generate historical demand profiles having a plurality of demand charge threshold (DCT) values over a period of time, filter the DCT values using weighting factors to provide filtered DCT values such that DCT underestimations and overestimations are removed from optimization, determine an optimal DCT output value from the filtered DCT values such that the optimal DCT output value is based on the historical demand profiles and the weighting factors, and distribute energy in one or more batteries in accordance with the optimal DCT output value and current energy demand to minimize energy and demand charges.

According to another aspect of the present principles, a non-transitory computer readable storage medium comprising a computer readable program for minimizing demand charges is provided. The computer readable program when executed on a computer causes the computer to perform a method for minimizing demand charges. The method includes generating historical demand profiles having a plurality of demand charge threshold (DCT) values over a period of time, filtering the DCT values using weighting factors to provide filtered DCT values such that DCT underestimations and overestimations are removed from optimization, determining an optimal DCT output value from the filtered DCT values such that the optimal DCT output value is based on the historical demand profiles and the weighting factors, and distributing energy in one or more batteries in accordance with the optimal DCT output value and current energy demand to minimize energy and demand charges.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
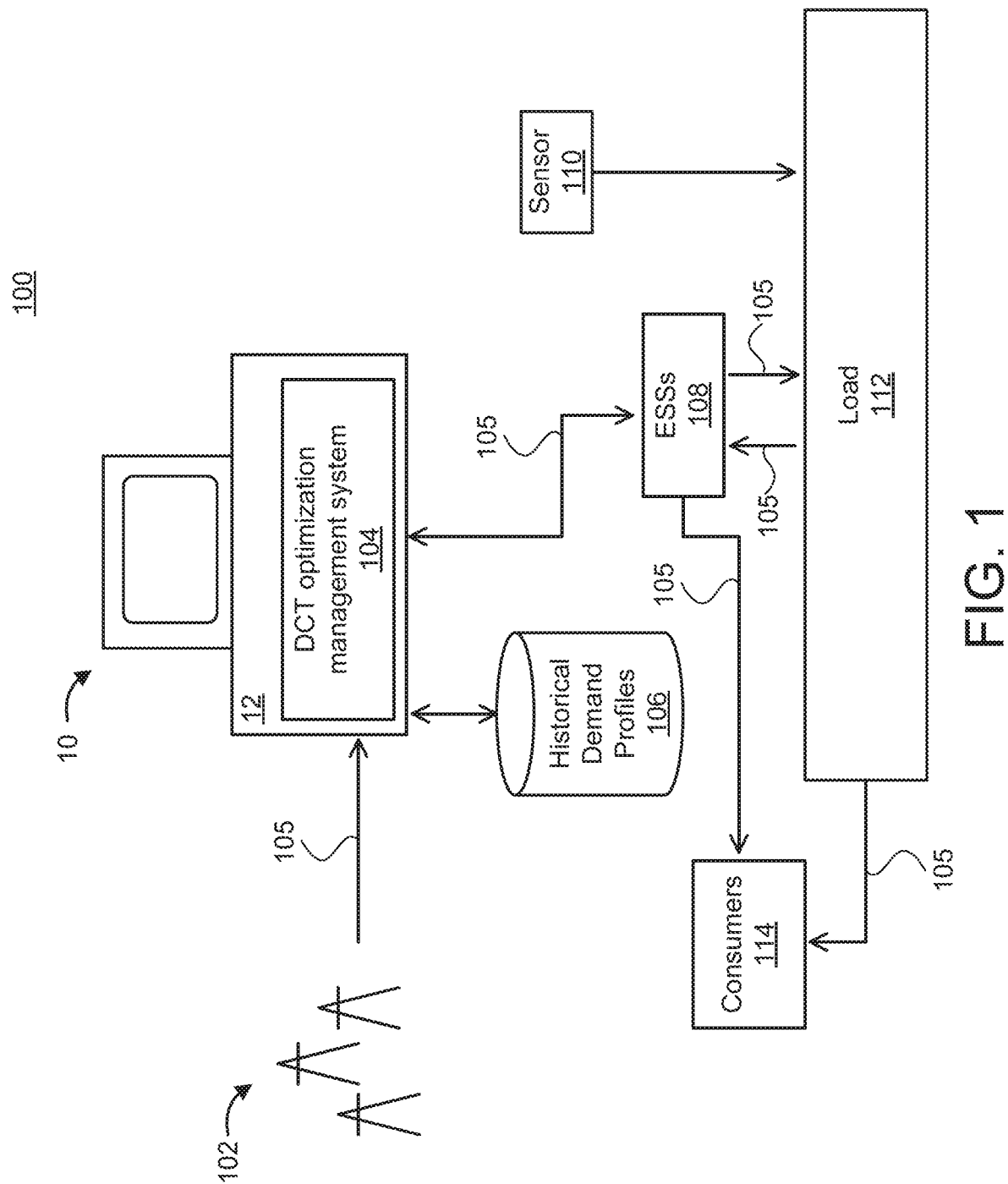
FIG. 1 is a block/flow diagram illustrating a system/method for management of energy storage system operations to minimize peak demand charges, in accordance with the present principles.

In accordance with the present principles, systems and methods are provided for generating a stochastic demand charge estimation for management of energy storage systems (ESSs), such as charging and discharging of one or more energy storage systems, to minimize peak demand charges. In some embodiments, an optimal Demand Charge Threshold (DCT) value is determined using historical demand profiles from the previous month and implemented to guide operation of ESSs (e.g., batteries) during the upcoming month. Aspects of the present principles provide DCT values that are closer to actual values compared with current practices, thereby increasing demand charge savings in comparison with current practices. Further, because battery utilization can degrade battery life, the present principles determine an optimal DCT value to guide distribution on energy from one or more batteries in manner to increase battery life and decrease battery degradation.

Often electricity charges for C&I businesses are comprised of two main parts, namely consumption charges and demand charges. An ESS can be used to reduce peak charges, and the present principles may be employed to manage energy storage system charge and discharge operations in a manner to minimize peak charges. In some embodiments, an energy storage system management solution is provided which can be used by electrical energy consumers to guide and/or schedule ESS operation using estimated DCTs to reduce the peak charges.

Systems and methods, according to the present principles, are adaptive to changes in demand profiles and real-time operation, and weighting factors can be applied to optimize the DCT result in accordance with various embodiments. Further, the present principles are adaptive to "worst case" scenarios where DCT demand profiles exhibit higher than average DCT values. The present principles may be employed to control energy storage system charge/discharge operations to reduce the peak charges for end users (e.g., energy consumers), details of which will be described in further detail herein.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, an exemplary stochastic DCT power system 100 is illustratively depicted in accordance with an embodiment of the present principles. In one embodiment, the power system 100 includes a source 102, stochastic DCT optimization management system 104, historical demand profiles 106, one or more energy storage systems 108, one or more sensors 110, a load 112, and consumers 114. The DCT optimization management system 104 may include program instructions which may be stored in memory 12 of a computer system 10.

In some embodiments, the one or more energy storage systems (ESSs) 108 may include an array of batteries that store (e.g., charge) energy generated by the source 102 and discharge energy to the load 112 and/or directly to the consumer 114. For example, the one or more ESSs 108 (also collectively referred to hereinafter as "battery") can perform charging/discharging based on an optimal DCT output value generated by the DCT optimization management system 104, as will be described in further detail below. The stochastic DCT optimization management system 104 can control the flow of energy/power, as illustrated by arrows 105, from the source 102 to the ESSs 108 and/or load 112, as well as from the ESSs 108 to the load 112 and/or consumer 114. It should be understood that the source 102 may include a plurality of sources, such as, but not limited to, energy derived from power plants, solar farms, wind farms, etc., and the load 112 represents an entity that consumes energy, such as a power/energy grid, power distribution system, sub-station, etc.

In some embodiments, energy generated from the source 102 may be directly provided to the load 112 and/or consumer 114, such that the energy is directly consumed as it is generated. In an embodiment, the DCT optimization management system 104 can control storage of energy (e.g., charge) with respect to the ESSs 108 when consumption by the load 112 is low, and supply (e.g., discharge) energy from the ESSs 108 when consumption by the load 112 is high, such as during peak usage times.

The DCT optimization management system 104 generates at least one optimal DCT value (e.g., DCT output) using the historical demand profiles 106. In some embodiments, the optimal DCT output value can be based on daily DCTs from a previous month and may be employed to forecast the following month's expected DCT values. In other embodiments, the optimal DCT value may be based on a predetermined time period (e.g., the last fifteen days, 24 hours, etc.). In yet further embodiments, the optimal DCT output value can be based on historical demand profiles from the same month in the previous year. The DCT optimization management system 104 can filter DCT values by classifying DCT values into subcategories using weights and determine a weighted average such that the optimal DCT output value is a weighted average of DCT values over the course of a period of time (e.g., 24 hour period, weekly, monthly, etc.).

The optimal DCT output value can be compared to current demand on the load 112 during the upcoming month to guide ESS 108 charge/discharge operations. For example, the DCT optimization management system 104 can charge the ESSs 108 when the current demand on the load 112 is less than the optimal DCT output value. Conversely, the DCT optimization management system 104 can discharge the ESSs 108 when the current demand on the load 112 is more than the optimal DCT output value. Accordingly, the DCT optimization management system 104 can operate as a Behind the Meter (BTM) management system and monitor consumption on the load 112 via one or more sensors 110. In addition, the DCT optimization management system 104 may monitor the ESSs 108 so as to maintain safe operating parameters of the ESSs 108.

The historical demand profiles 106 can be a database that stores demand profiles on the load for a period of time (e.g., hourly, monthly, etc.). For example, the historical demand profiles 106 can include an amount of energy a particular consumer draws from the load 112 for a particular month, including daily peak DCT levels (e.g., a highest demand threshold measured in kilowatts for each day). It should be noted that while a single consumer is disclosed, the historical demand profiles 106 can include demand profiles for a set of consumers, such as all consumers globally, or a plurality of consumers in a predetermined region (e.g., per county, state, country, etc.). The historical demand profiles 106 can be used to identify days within a month and/or a predetermined window in which peak usage (e.g., peak demand) and low usage (e.g., low demand) is consumed.

The sensor(s) 110 can monitor consumption on the load 112 and update the DCT optimization management system 104 with any changes to demand on the load 112, such as at each time step, in some embodiments. In further embodiments, the sensor 110 can monitor the ESSs 108 such that the ESSs 108 operate under safe operating parameters. For example, the sensor(s) 110 can monitor the battery capacity of the ESSs 108 and update the DCT optimization management system 104 when a minimum storage level (e.g., battery reserve) and/or maximum storage level (e.g., battery capacity) of the ESSs 108 is detected.

It should be noted that while the DCT optimization management system 104, historical demand profiles 106, ESSs 108, and sensor 110 are shown as separate elements of system 100, such features may be combined into a single system and/or unit. For example, aspects of the present principles can include one or more ESSs 108 that incorporate the features of the DCT optimization management system 104, historical demand profiles 106, and sensor 110. For example, in some embodiments, the DCT optimization management system 104 can operate as a battery management system (BMS) that provides various functions involved with its own energy storage devices, including protecting the batteries in the system from operating outside their established safety parameters and implementing peak shaving (e.g., charging/discharging).

Figure 2:
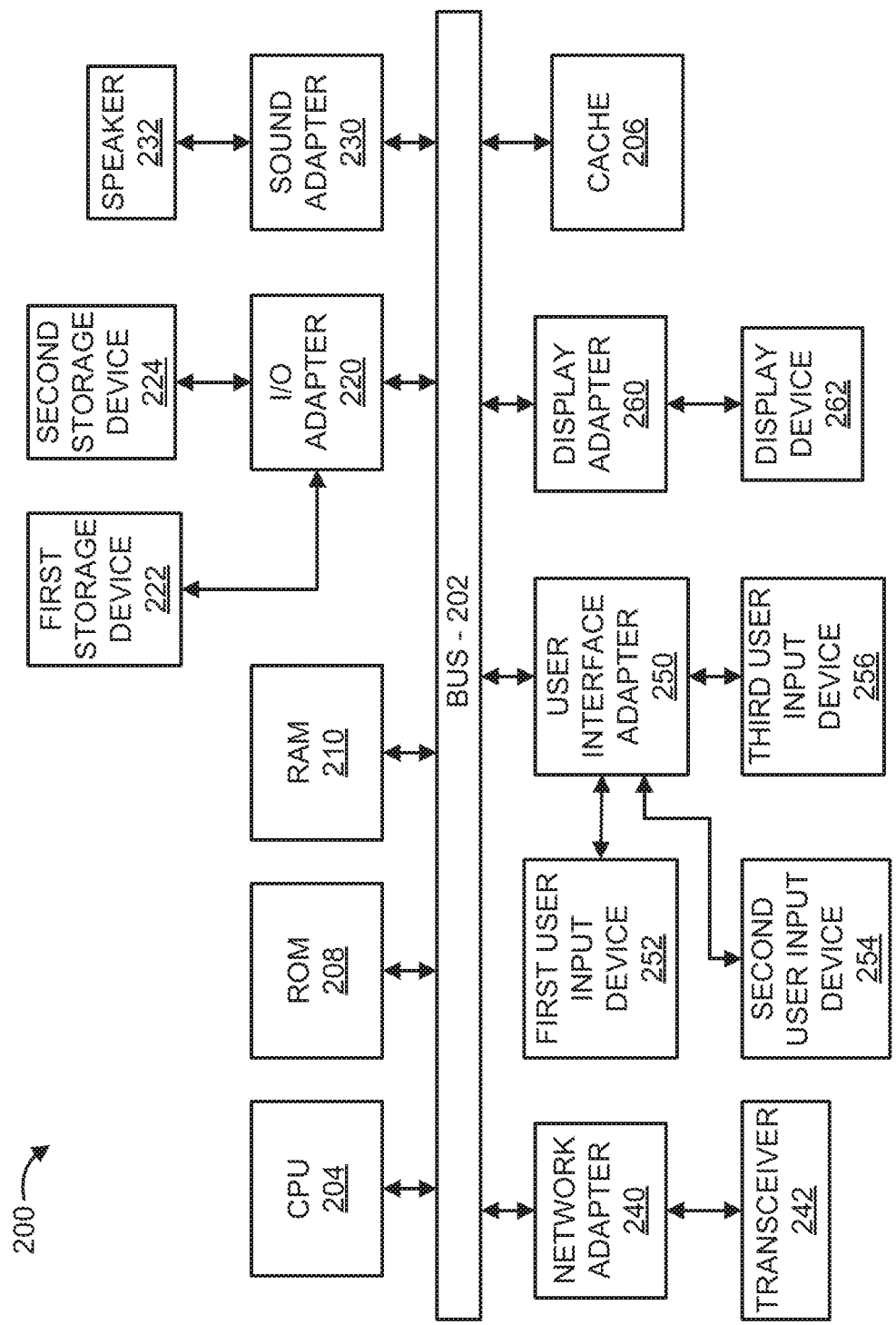
FIG. 2 is a block/flow diagram illustrating an exemplary processing system to which the present principles may be applied, in accordance with the present principles.

Referring now to FIG. 2, an exemplary processing system 200, to which the present principles may be applied, is illustratively depicted in accordance with one embodiment.

The processing system 200 includes at least one processor (CPU) 204 operatively coupled to other components via a system bus 202. A cache 206, a Read Only Memory (ROM) 208, a Random Access Memory (RAM) 210, an input/output (I/O) adapter 220, a sound adapter 230, a network adapter 240, a user interface adapter 250, and a display adapter 260, are operatively coupled to the system bus 202.

A first storage device 222 and a second storage device 224 are operatively coupled to system bus 202 by the I/O adapter 220. The storage devices 222 and 224 can be any of a disk storage device (e.g., a magnetic or optical disk storage device), a solid state magnetic device, and so forth. The storage devices 222 and 224 can be the same type of storage device or different types of storage devices. In some embodiments, the storage devices 222, 224 can store historical demand profiles having DCT values that span over a period of time. The storage devices 222, 224 can be accessed to provide the historical demand profiles at each time step.

A speaker 232 is operatively coupled to system bus 202 by the sound adapter 230. A transceiver 242 is operatively coupled to system bus 202 by network adapter 240. A display device 262 is operatively coupled to system bus 202 by display adapter 260.

A first user input device 252, a second user input device 254, and a third user input device 256 are operatively coupled to system bus 202 by user interface adapter 250. The user input devices 252, 254, and 256 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 252, 254, and 256 can be the same type of user input device or different types of user input devices. The user input devices 252, 254, and 256 are used to input and output information to and from system 200. For example, updates to the historical demand profiles, such as updating DCT values over a period of time, can be made through the user input devices 252, 254, 256, according to some embodiments. In further embodiments, battery reserve settings for one or more energy storage units may be set by a user via the user input devices 252, 254, and 256.

Of course, the processing system 200 may also include other elements (not shown), as readily contemplated by one of skill in the art, as well as omit certain elements. For example, various other input devices and/or output devices can be included in processing system 200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 200 are readily contemplated by one of ordinary skill in the art given the teachings of the present principles provided herein.

Moreover, it is to be appreciated that systems 100, 200, 300, and 700, described with respect to FIGS. 1, 2, 3, and 7, respectively, are systems for implementing respective embodiments of the present principles. Part or all of processing system 200 may be implemented in one or more of the elements of systems 100, 300, and 700, according to various embodiments of the present principles.

Further, it is to be appreciated that processing system 200 may perform at least part of the method described herein including, for example, at least part of methods 300, 400, 500 and 600 of FIGS. 3, 4, 5 and 6, respectively. Similarly, part or all of systems 100, 300, and 700 may be used to perform at least part of methods 300, 400, 500 and 600 of FIGS. 3, 4, 5 and 6, respectively, according to various embodiments of the present principles.

Figure 3:
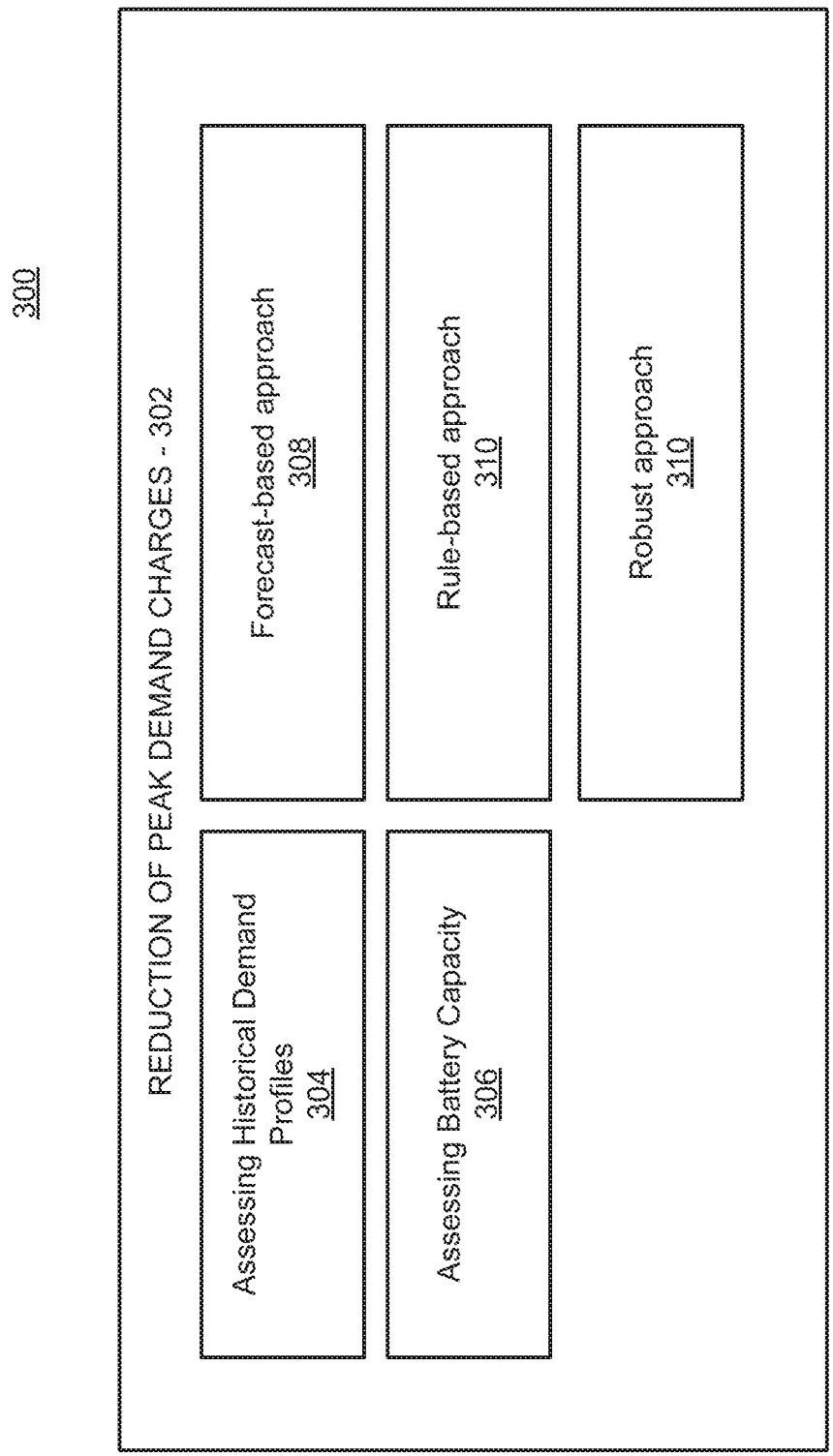
FIG. 3 is a block/flow diagram illustrating a high-level system/method for management of energy storage system operations to minimize peak demand charges, in accordance with the present principles.

Referring now to FIG. 3, with continued reference to FIG. 1, a high-level system/method 300 for management of energy storage system operations to minimize peak demand charges is illustratively depicted in accordance with an embodiment of the present principles. In one embodiment, reduction (e.g., minimizing) of peak demand charges may be performed in block 302 in accordance with the present principles. Such minimizing may be managed by, for example, a controller (e.g., microcontroller) or computer/servers or cloud, and reduces the peak charges for electricity consumers by, for example, coordinating charging and discharging operations of one or more ESSs. In some embodiments, the operations of block 302 may be implemented by the DCT optimization management system 104 of FIG. 1.

The management system/method 300 may generate/forecast at least one optimal DCT value (e.g., DCT output) based on historical demand profiles, as will be described in further detail below. The optimal DCT output value can be compared to current demand on the load during the upcoming month to guide ESS charge/discharge operations and distribute energy to/from one or more batteries. The optimal DCT value is closer to expected values for the upcoming month versus values generated using conventional max/min approaches. In some embodiments, the optimal DCT value is compared to the current demand on the load to manage monthly electricity demand and achieve higher Demand Charge (DC) savings to consumers. For example, the ESSs can be charged when the current demand is below the optimal DCT output value, and discharged when the current demand is above the optimal DCT output value.

Demand charges can be imposed on consumers due to use of power during peak demand. Such demand charges are based on an average usage of energy for each 15-minute interval over the course of a given month. A consumer is subjected to demand charges for days in which their respective energy consumption (e.g., demand) exceeds a particular value. Each day of any given month, demand on the load, usually measured in kilowatts, can be monitored and recorded to generate historical demand profiles and estimate DCTs for the upcoming month.

However, accurately predicting DCTs is challenging. Conventional systems, such as those which employ DCT "max" and "min" values, either overestimate or underestimate the peak demand since such systems utilize only one DCT value, such as the highest or lowest DCT value (e.g., for a single day), over the course of a month. Accordingly, such conventional systems result in a less efficient peak shaving and reduced peak savings. Further, battery degradation is significantly high when the min DCT value is employed, since the DCT value is underestimated and the battery will keep discharging to offset energy consumption.

In some embodiments, the optimization engine disclosed herein generates an optimal DCT output value to guide ESS operation. The optimal DCT output value can be a weighted average of daily DCT values over the course of a particular amount of time (e.g., a month prior), according to some embodiments. Thus, the stochastic optimization disclosed herein forecasts an optimal DCT output value closer to actual DCT values for the following time period (e.g., month), which can guide battery energy distribution and decrease battery degradation since battery discharge and charge operations are optimized.

In block 304, historical demand profiles on the load are assessed. A sensor, such as sensor 110, monitors the demand on the load 112 and provides historical demand data (e.g., "historical demand profiles"), such as an amount of kilowatts utilized for that particular time period (e.g., 24 hours). It should be noted that historical demand data can be daily demand data (e.g., data collected over a 24 hour period of time), however other time spans are readily contemplated. In an embodiment, the historical demand profiles are stored in a database. The historical demand profiles 202 each include peak demand level information (e.g., DCT values) for each day over the course of a period of time (e.g., any given month). For example, the DCT values for each day (e.g., daily DCT value) include an amount of energy (e.g., measured in kilowatts) demanded from the load. Each demand profile includes daily DCT peak information. For example, DCT peak information is measured for each day during the month of February, which may include 28-29 days, and such information is used to estimate the DCT output for the upcoming month (e.g., March), as will be described in further detail below.

In block 306, battery capacity of the one or more ESSs is assessed. Each ESS device, such as accumulators, batteries, etc., can be charged and discharged to help reduce peak charges. The state of charge (SoC) is a measure of charge of the ESS device. For example, the SoC can be measured as a percentage (e.g., 100% full, 0% empty, and varying degrees therein). The battery SoC increases as the battery charges, and the battery SoC decreases as the battery discharges energy. Block 306 can determine a capacity level for each ESS, such as a total amount of energy the ESS can hold, and/or the SoC for each ESS.

The battery may not be able to dispatch energy when the battery has run out of charge. To avoid this situation, part of the battery energy can be reserved. The reserved energy is a fixed portion of battery energy which is excluded from any planning and optimization. In some embodiments, assessing the battery capacity can include determining a battery reserve capacity setting for each battery. The battery reserve capacity setting is a predetermined amount of energy reserved in the battery specifically to be utilized during peak demand. In block 306, the battery reserve capacity setting can be assessed, and the battery reserve capacity setting can be utilized as a minimum energy level of the one or more ESSs during stochastic optimization.

In system/method 300, peak demand charges may be reduced in accordance with various embodiments of the present principles. In one embodiment, a forecast-based approach 308 may be employed to minimize peak demand charges. This approach 308 may include forecasting a user load profile for an upcoming month based on historical load data, and solving an optimization problem to generate an optimal DCT output value to guide ESS operation and minimize peak charges. In some embodiments, stochastic optimizations methods, rather than deterministic optimization methods, can be used. In an embodiment, this approach 308 can filter DCT values by classifying and/or assigning weighting factors to daily DCT values to obtain a weighted DCT average and distribute energy to/from one of more batteries. In further embodiments, this approach 308 can update historical demand profiles using up-to-date daily DCT values to generate the optimal DCT output value. For example, the optimal DCT output is a weighted average of daily DCT values. Output from the forecast-based approach 308 may include issuing control commands to distribute energy to/from batteries units in accordance with the present principles.

Because the actual DCT demand on the load fluctuates throughout the month, using a single "min" and "max" DCT level for the month does not accurately provide a DCT value that best follows actual DCT output for the following month. For example, if the peak demand of the last month is much higher than that of an upcoming month, the DCT value provided by a "max" approach may overestimate the upcoming month's peak demand, which results in a too high DCT value. In comparison, the "min" approach utilizes the minimum DCT value over the last month as the DCT for the upcoming month, which clearly is an underestimation of actual DCT values. The present principles provide a forecast-based approach 308 to generate an optimal DCT output value closer to actual DCT values for the following month without severely under or overestimating the DCT output for the following month.

In one embodiment, a rule-based approach 310 may be employed to minimize peak demand charges. The rule-based approach 310 may integrate real-time operation into the optimization problem. For example, current load parameters and battery parameters are monitored and implemented in the optimization problem such that if the optimal DCT output value is more than the current amount of energy demanded from the load, the ESSs will charge. However, if the optimal DCT output value is less than the current amount of energy demanded from the load, the ESSs will discharge to supplement energy demanded from the load. Because energy is supplemented from the ESS devices, demand charges can be reduced since the energy is being supplied by the ESS devices and not from the load. In this embodiment, the stochastic DCT optimization model can be a linear programming model which determines optimal values of DCTs that achieve maximum total demand charge reductions over various scenarios. Output from the rule-based approach 310 may include issuing control commands to batteries/inverter units in accordance with the present principles.

In block 312, a robust approach 312 can be employed in accordance with the present principles, in which the historical demand profiles are adjusted to generate expanded demand profiles. In an embodiment, daily DCT peaks in the historical demand profiles may be exaggerated and/or expanded (e.g., heightened demand measurements (kW), and/or lengthened demand peaks) such that the daily expanded DCTs exhibit higher DCT values over a longer period of time than its corresponding historical DCT value. Accordingly, the expanded demand profiles provide "worst case" demand profiles having elevated DCT values. These elevated DCT values can be employed in the optimization problem to generate the optimal DCT output value. Output from the robust approach 312 may include issuing control commands to batteries/inverter units in accordance with the present principles.

Figure 4:
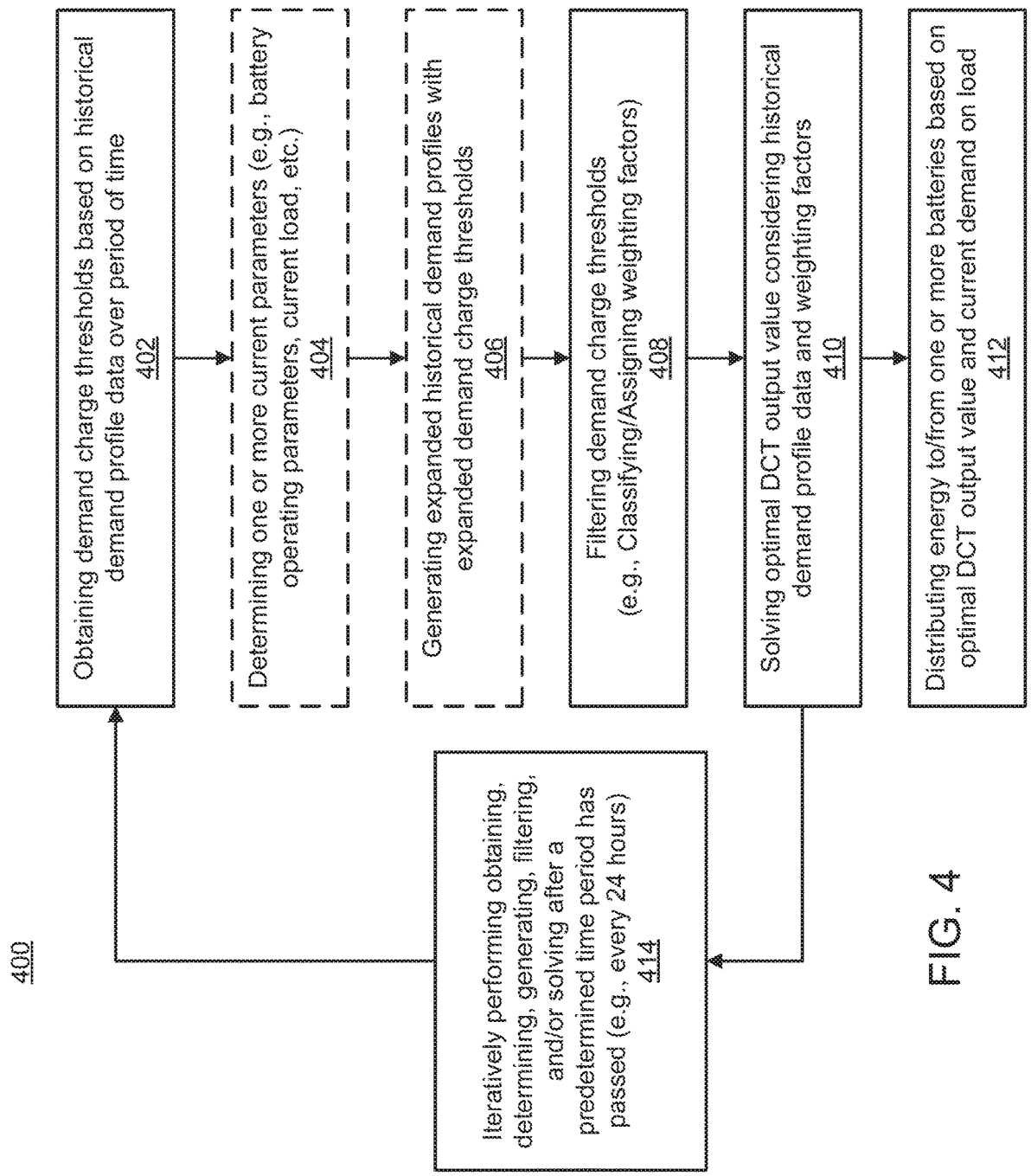
FIG. 4 is a block/flow diagram illustrating a system/method for determining optimal demand charge thresholds (DCTs) for management of energy storage system operations to minimize peak demand charges, in accordance with the present principles.

Referring now to FIG. 4, a high level method 400 for management of energy storage systems to minimize peak demand charges is illustratively depicted in accordance with the present principles.

In one embodiment, in block 402, a plurality of demand charge thresholds may be obtained based on historical demand profile data measured over a period of time (e.g., one month). For example, the historical demand profiles each include actual daily DCT values for each day over the course of a given month. The DCT values for each day (e.g., daily DCT value) include an amount of energy (e.g., measured in kilowatts) demanded from the load. It should be noted that the historical demand profile data is discussed as data ranging over the course of a given month; however, the data can also include data from a same month from the previous year and/or a specified time frame (e.g., the last 30 days) set by a user.

In block 404, one or more current parameters can be determined. In some embodiments, determining one or more current parameters may include determining a current demand on the load. In an embodiment, the one or more current parameters may include operating parameters of an ESS or battery, such as the state of charge (SoC), battery charging ($Pchg_d^t$ for day d and time interval t) and discharging powers ($Pdsg_d^t$), and amount of energy ($E_d^{t-1}$ which is constrained by minimum $E^{min}$ and maximum $E^{max}$ levels) stored in the ESS.

In addition, some ESS devices may have a battery capacity reserve setting which is a predetermined amount of charge within the ESS dedicated to reserve discharge. The reserve discharge is a portion of energy stored within the battery that is "reserved" until all other energy is discharged from the ESS. In some embodiments, determining one or more current parameters includes determining a reserve setting value for the one of more ESSs. If the ESS device runs out of energy before peak demand arrives and/or fails to discharge during peak demand, DC reduction would be significantly compromised. To ensure that the ESS device is charged such that the ESS can be implemented during peak shaving, the reserve setting value for the one or more ESSs is determined. In some embodiments, the reserve setting value limits the ESS's battery discharging power to a level lower than discharging maximum power $P_{max}$ when the SoC of the ESS drops below a predetermined threshold $SoC_{low}$ as follows:

$$Pdsg_d^t = \min(P^{max}, L_d^t - DCT) \text{ if } (L_d^t > DCT \text{ and } SoC_d^t \geq SoC_{low})$$

where $Pdsg_d^t$ is the battery discharging power at time step t and day d, $E_d^t$ is the load at time step t, day d, and $P_{max}$ is the battery power rating. Block 404 can determine a capacity level for each ESS, such as a total amount of energy the ESS can hold, and/or the SoC for each ESS.

In block 406, the plurality of DCT values for each of the historical demand profiles are expanded to generate expanded DCT values (e.g., expanded daily DCT values). The expanded DCT values can be employed in lieu of the actual DCT values for optimization. For example, expanding the DCT values may include applying a filter to the peak demand for each day to "widen" and/or expand the peak demand for a given month. The filter separates the peaks in each profile based on predefined conditions (e.g., expected duration and/or magnitude of the peak) for the peak and then widens the peaks to a predetermined amount (e.g., ten percent). Each peak in the historical demand profiles may be identified, and each peak may be expanded to simulate "worst case" demand profiles. The "worst case" demand profiles, referred to herein as expanded DCT values, can by utilized to generate an optimal DCT output value for forecasting DCTs and guiding ESS operations. An example of expanded DCT values is described in further detail below with respect to FIG. 5. Accordingly, the optimal DCT output value can reflect demand profiles projecting higher demands than the previous month.

In block 408, the plurality of DCT values can be filtered to remove outlier DCT values (e.g., DCT under and over estimations) and provide filtered DCT values. In some embodiments, filtering the DCT values may include classifying the plurality of DCT values into sub-categories and assigning a weighting factor (e.g., weight) to each of the plurality of DCT values based on its respective classification. For example, the daily DCT values for a given month can be classified as low demand, mid-demand, and high demand days. To prevent extraneous and/or extreme high/low daily DCT values from generating an optimal DCT value, which can cause under or overestimation of actual demands measured in the following month, low demand and/or high demand days may be "weighted" differently than the average mid-demand days.

In some embodiments, for example, days having a DCT value in a bottom twenty percent may be classified as low demand days, and days having a DCT value in a top ten percent may be classified as high demand days, while the remainder days (e.g., approximately 20%-90%) may be classified as mid-demand days. It should be noted that other percentages may be implemented. A smaller weight is applied to low demand days and/or high demand days to avoid such daily DCTs that under or overestimate the upcoming month's demand profiles. Accordingly, the daily DCTs that reflect low demand and/or high demand which have little to no impact on the DCT results from the historical demand profile are weighted much less than mid-demand days to more accurately provide the optimal DCT value.

In some embodiments, a weight factor ($\omega$) of 1 (e.g., $\omega_{mid}=1$) can be applied to DCTs that are classified as mid-demand days, a weight $\omega_{low}=0$ to DCTs classified as low demand days, and a weight $\omega_{high}=0.5$ to DCTs that are classified as high demand days. Advantageously, the weighting factors effectively "remove" the low demand and/or high demand DCT values in solving for the optimal DCT output value, especially since such low/high demand days are irrelevant to the optimal DCT results. In addition, weighting of the DCT values also reduces the number of scenarios to be considered and reduces the solution time of stochastic optimization. The solution time reduces because some of the scenarios are omitted from the optimization scheme by assigning weighting factor of zero to such scenarios. In addition, the present principles reduce computational resources, since less memory is needed to determine the optimal DCT output value. An example of weighted daily DCT values is described in further detail below with respect to FIG. 6.

In block 410, the optimal DCT output value may be determined based on historical demand profile data of a previous month using a stochastic demand charge threshold calculation engine. In one embodiment, the stochastic demand charge threshold calculation engine solves the optimal DCT output value using the forecast-based approach 308 of FIG. 3. For example, daily DCT values from the historical demand profiles for a previous month can be obtained, in addition to one or more current parameters (e.g., battery capacities/constraints). During the forecast-based approach, the demand charge threshold calculation engine classifies the daily DCT values and applies a weighting factor to each of the daily DCT values based on their respective classification.

In some embodiments, the optimal DCT output value can be a weighted average of DCT values. The optimal DCT output value can be solved using an optimization problem which can be written as follows:

$$\text{Optimal } DCT \text{ output value} = \frac{1}{D}\pi^{anytime}\sum_{d \in D}\omega_d(\text{Peak}_d^{anytime} - DCT_d^{anytime}) +$$

$$\frac{1}{W}\pi^{partial}\sum_{w \in W}\omega_w(\text{Peak}_w^{partial} - DCT_w^{partial}) +$$

$$\frac{1}{W}\pi^{peak}\sum_{w \in W}\omega_w(\text{Peak}_w^{peak} - DCT_w^{peak})$$

where D is a set of all days in a historical demand profile, W is a set of weekdays, $\pi^{anytime}$ is a demand charge rate at any time, $\pi^{partial}$ is a partial demand charge rate, $\pi^{peak}$ is a peak demand charge rate, $\omega_d(\omega_w)$ is a weight of day d (weekday w), $\text{Peak}_d^{anytime}$ is peak demand of day d, $\text{Peak}_w^{partial}$ peak demand of weekday w during partial peak period, $\text{Peak}_w^{peak}$ is peak demand of weekday w during partial peak period, $DCT_d^{anytime}$ is DCT of day d, $DCT_w^{partial}$ is DCT of weekday w during partial peak period, and $DCT_w^{peak}$ DCT of weekday w during peak period. The optimal DCT output value is the summation of the weighted average of anytime demand charge reductions, the weighted average of partial peak demand charge reductions, and the weighted average of peak demand charge reductions, according to some embodiments.

The demand charge rates t are chosen by the utility companies. More specifically, demand charge rates for anytime, partial, and peak are chosen by the utility. In addition, each demand charge rate has its own period during a day. For example, in some utilities, partial period is 8:30-12:00 and 18:00-21:30 every day, and partial demand charge rates are applied during these two periods. Partial DCT is calculated from the historical demand profile similar to other DCTs.

In one embodiment, the stochastic demand charge threshold calculation engine solves the optimal DCT output value using the rule-based approach 310 of FIG. 3. For example, the DCT values from the historical demand profiles for a given amount of time (e.g., a previous month) can be obtained, in addition to one or more current parameters. The one or more current parameters may include, for example, current load data. The demand charge threshold calculation engine filters the DCT values by classifying the DCT values and applying a weighting factor to each of the DCT values based on their respective classification. During the rule-based approach, the demand charge threshold calculation engine determines the optimal DCT output value together with the current demand profile (e.g., current load) to determine battery dispatch according to several dispatch rules.

For example, in each time interval t, if the load $L_d^t$ is less than the optimal DCT output value $DCT_d^t$, the one or more ESS devices 108 will charge. The charging power can be adjusted in such a way to ensure: 1) grid power (load plus charging power) is not greater than the optimal DCT output value, 2) accumulated battery energy is less than battery energy capacity, and 3) charging power is less than battery power capacity. On the other hand, if the load $L_d^t$ is greater than the optimal DCT output value $DCT_d^t$, the one or more ESS devices 108 will discharge. The discharging power can be adjusted in such a way to ensure: 1) grid power (load minus discharging) is not greater than the optimal DCT output value (the battery discharges as little as possible to save energy for future discharge needs), 2) battery energy does not drop below minimum energy capacity, and 3) discharging power does not exceed battery power capacity. In some embodiments, the DCT optimization management system 104 performs ESS management accordingly to the following formula:

$$\text{if}(DCT_d^t - L_d^t \geq 0)$$
$$Pdsg_d^t = 0$$
$$Pchg_d^t = \min\left(DCT - L_d^t, \frac{E^{max} - E_d^{t-1}}{\Delta t}, P^{max}\right)$$
else
$$Pchg_d^t = 0$$
$$Pdsg_d^t = \min\left(L_d^t - DCT, \frac{E_d^{t-1} - E^{min}}{\Delta t}, P^{max}\right)$$

where $DCT_d^t$ and $L_d^t$ are DCT and demand at interval t of day d. $Pchg_d^t$ and $Pdsg_d^t$ are battery charging and discharging powers. $E_d^{t-1}$ is the energy stored in battery. $E^{min}$ and $E_{max}$ are minimum and maximum energy of the battery. $P^{max}$ is the battery power capacity. If the optimal DCT output value minus the current load is greater than or equal to zero, the ESS devices will charge constrained by the maximum energy capacity of the batteries. The ESS devise will not discharge energy, as evidenced by the fact that the discharging power $Pdsg_d^t$ is zero. Alternatively, if the optimal DCT output value minus the current load is less than zero, the ESS devices will discharge energy constrained by the minimum energy capacity of the batteries. Thus, the charging power $Pchg_d^t$ of the batteries is zero when the current load is more than the optimal DCT output value.

In one embodiment, the stochastic demand charge threshold calculation engine solves the optimal DCT output value using the robust approach 312 of FIG. 3. For example, the historical demand profiles are adjusted to generate expanded demand profiles, as illustrated in block 406. DCT peaks in the historical demand profiles may be extended and/or heightened such that the expanded DCTs exhibit higher DCT values over a longer period of time than its corresponding historical DCT value to provide "worst case" demand profiles having elevated DCT values. For example, the expanded demand profiles exhibit higher daily DCT values (e.g., measured in kilowatts) over an extended amount of time (e.g., exaggerated minutes, hours, etc.). These elevated/expanded DCT values can be employed in the optimization problem to generate the optimal DCT output value.

In block 414, the obtaining of block 402, determining of block 404, generating of block 406, assigning of block 408, and solving of block 410 may be iteratively performed after a predetermined time period has passed (e.g., every 24 hours), in accordance with various embodiments of the present principles. For example, stochastic optimization to determine the optimal DCT output value can be performed every month or, in some embodiments, can be performed every day with up-to-date historical demand profile data. In some embodiments, the optimal DCT output value can be determined once at the beginning of each month using the previous month's demand profile. In block 414, the optimal DCT output value can be updated to reflect information generated during the predetermined time period.

For example, the optimal DCT output value can be re-solved taking into account daily DCT values over the last few days instead of the previous month alone. The updated optimal DCT value reflects more up-to-date daily DCT values. In some embodiments, the updated optimal DCT value and the original optimal DCT value can be compared, and the higher of the two results may be used by the DCT optimization management system. Accordingly, a "moving window" of daily DCT values may be utilized to generate the optimal DCT value. The moving window increases DCT generating frequency from every month to every day, or every hour, if desired. With the latest historical demand profiles as inputs, the moving time window can update the DCT values more often thereby resulting in more DC reductions.

The optimal DCT output value can be used by a controller to issue control commands to batteries/inverter units in accordance with the present principles, as illustrated in block 412. For example, the method 400 may include distributing energy to/from one or more batteries in accordance with the optimal DCT output value and the current demand on the load. In some embodiments, the DCT optimization management system 104 of FIG. 1 can instruct the one or more ESS devices to charge/discharge energy based on the optimal DCT output value.

Figure 5:
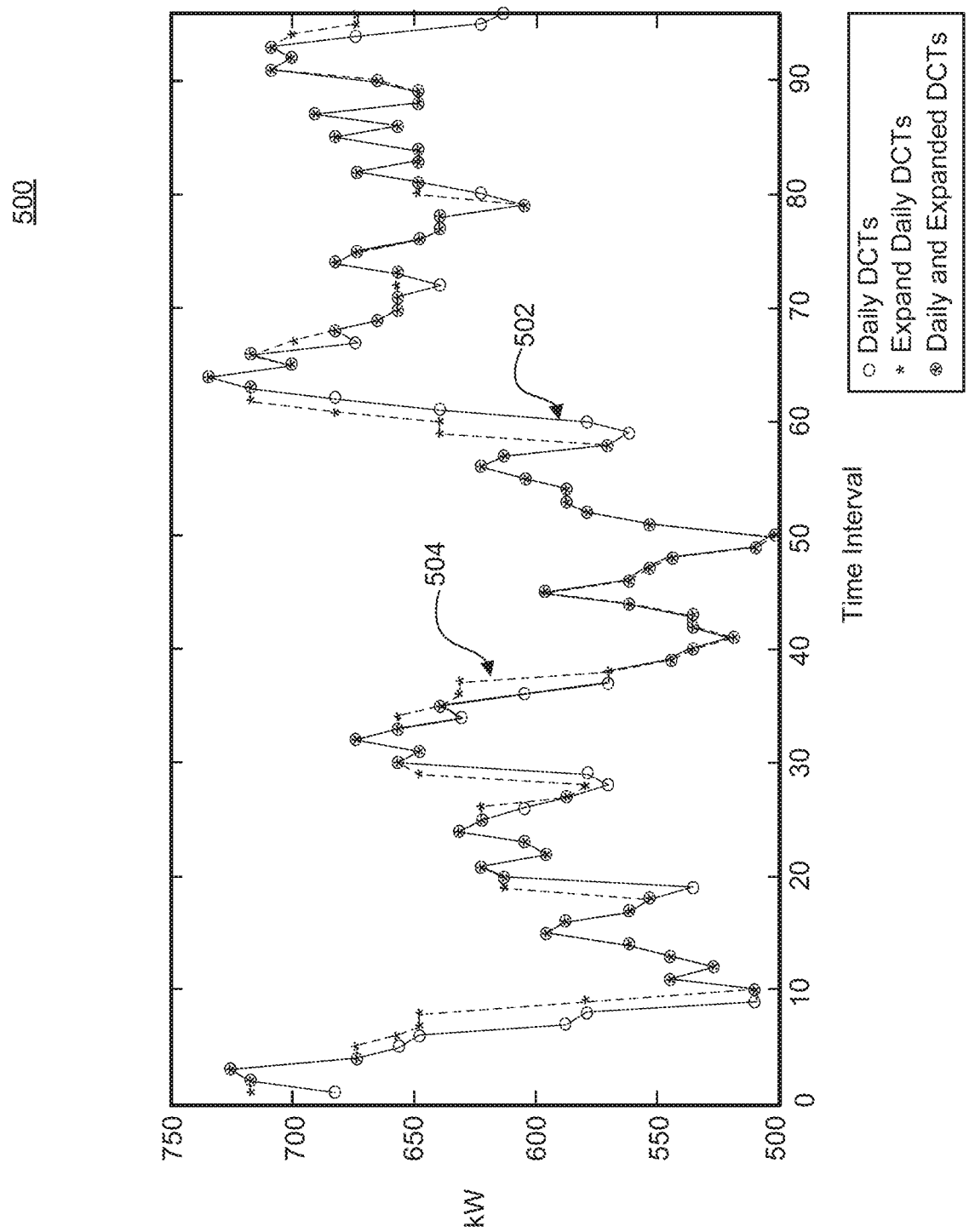
FIG. 5 is a graph illustrating generating expanded DCTs from actual DCTs and, in accordance with the present principles.

Now referring to FIG. 5, a graph 500 showing an exemplary plot of demand charge thresholds 502 and expanded demand charge thresholds 504 is illustratively depicted in accordance with the present principles. As shown in graph 500, daily demand is monitored over a time interval (e.g., minutes, hours, monthly, yearly, etc.) to provide daily DCT values (e.g., plot points in graph 500), some of which exhibit peaks in which demand on the load is the highest. For example, the time interval depicted in FIG. 5 can be every 15 minutes totally to 96 measurements equaling to a full day (e.g., 24 hours). As discussed above, the daily DCT values can be heightened/expanded to generate a plot of expanded daily DCT values 504. Thus, each peak demand is "widened" to simulate a "worst case" demand profile 504 that exhibits higher DCT values over a longer period of time. The expanded DCT values can be used in the optimization problem to determine an optimal DCT output value, thereby helping to prevent and/or eliminate underestimating the optimal DCT value from actual DCT values.

Figure 6:
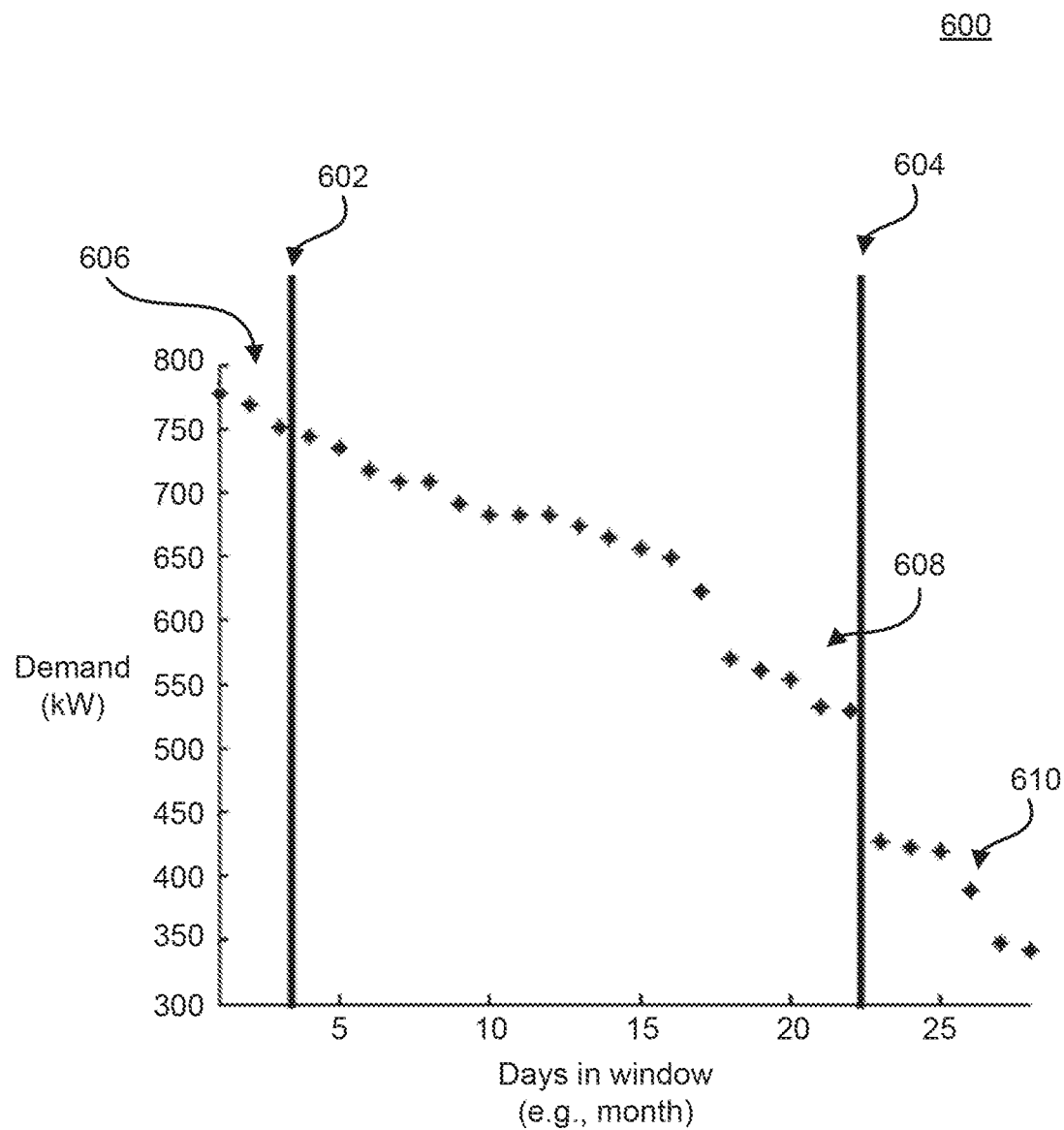
FIG. 6 is a graph illustrating categorization of exemplary DCTs, in accordance with the present principles.

Now referring to FIG. 6, a graph 600 showing exemplary demand charge thresholds is illustratively depicted in accordance with the present principles. As shown in graph 600, daily demand is monitored over a period of time (e.g., a month) to provide daily DCT values. As shown in graph 600, the daily DCT values (shown as plot points) can be classified into high-demand days 606, mid-demand days 608, and low demand days 610. A high threshold value 602, for example, may be used to classify a top ten percent of the daily DCT values for the given month as high demand days, and low threshold value 604 may be used to classify a bottom twenty percent of the daily DCT values for the given month as low demand days. Weighting factors can be applied to the daily DCT values dependent on their respective classification to remove DCT outliers and more accurately determine the optimal DCT output value. For example, mid-demand days 608 may be weighted higher than low-demand 610 and/or high-demand days 606 such that the optimal DCT output value is a weighted average and reflect a value closer to actual DCT values in the following month.

Figure 7:
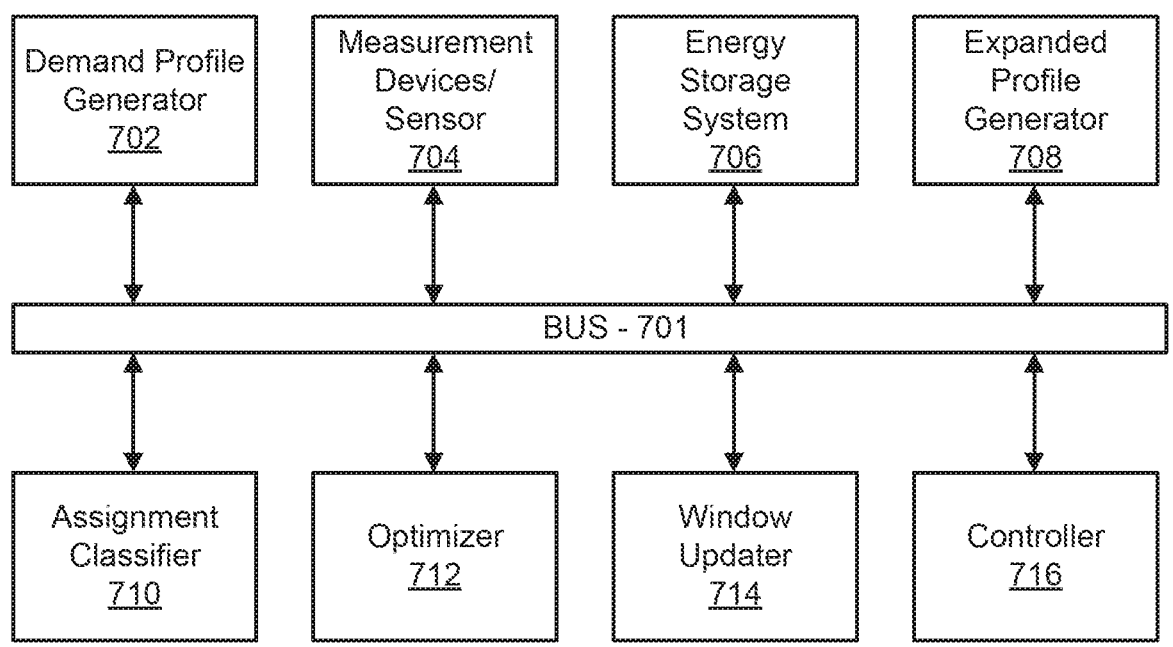
FIG. 7 is a block/flow diagram illustrating a system for management of energy storage system operations to minimize demand charges, in accordance with the present principles.

Referring now to FIG. 7, an exemplary system 700 management of energy storage system operations to minimize demand charges is illustratively depicted in accordance with the present principles.

While many aspects of system 700 are described in singular form for the sake of illustration and clarity, the same can be applied to multiples ones of the items mentioned with respect to the description of system 700. For example, while a single energy storage system 706 is described, more than one energy storage system 706 can be used in accordance with the teachings of the present principles, while maintaining the present principles. Moreover, it is appreciated that the energy storage system 706 is but one aspect involved with system 700 than can be extended to plural form while maintaining the present principles.

The system 700 can include a bus 701, which may be connected to one or more computing networks, storage devices (not shown), and/or measurement devices and sensors 704 in accordance with various embodiments. In one embodiment, a demand profile generator 702 may be employed to assess current peak demand charges and generate historical demand profiles. Measurement devices 704 (e.g., sensors) may be deployed throughout one or more energy management/storage systems to, for example, obtain physical measurements of various portions of the energy management/storage systems for use as input to the system according to the present principles. An energy storage system 706, such as a battery, inverter, grid meter, etc., may be employed for energy storage, measurements, etc.

In various embodiments, an expanded profile generator 708 may be employed to assess current peak demand charges and generate expanded historical demand profiles. An assignment classifier 710 classifies daily DCT values and assigns weighting factors to each of the daily DCT values to filter the DCT values over a period of time. An optimizer 712 may be employed to optimize various portions of the system and method using, for example, a stochastic demand charge threshold calculation engine in accordance with the present principles, and window updater 714 may be employed to provide optimization every day with up-to-date demand profile data to update the optimal DCT output value. A controller 716 may be employed to control, for example, energy storage system charge/discharge operations in accordance with the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for minimizing demand charges, comprising:
generating historical demand profiles having a plurality of demand charge threshold (DCT) values over a period of time;
filtering the DCT values using weighting factors to provide filtered DCT values such that DCT underestimations and overestimations are removed from optimization;
determining an optimal DCT output value from the filtered DCT values such that the optimal DCT output value is based on the historical demand profiles and the weighting factors; and
distributing energy in one or more batteries in accordance with the optimal DCT output value and current energy demand to minimize energy and demand charges;
wherein filtering the DCT values includes:
classifying the plurality of DCT values into a plurality of sub-categories based on threshold values; and
assigning a weighting factor to each of the plurality of DCT values, wherein the weighting factor for each of the plurality of DCT values is different than each other; and
wherein classifying the plurality of DCT values includes sub-dividing the plurality of DCT values into one of a low-demand category, mid-demand category, and high demand category;
and assigning a weighting factor includes assigning a first weight value for DCT values in the low-demand category, assigning a second weight value for DCT values in the mid-demand category, and assigning a third weight value for DCT values in the high-demand category, wherein the third weight value is greater than the first weight value and less than the second weight value.

2. A system for minimizing demand charges, comprising:
a processor coupled to a memory, the processor being configured to:
generate historical demand profiles having a plurality of demand charge threshold (DCT) values over a period of time;
filter the DCT values using weighting factors to provide filtered DCT values such that DCT underestimations and overestimations are removed from optimization;
determine an optimal DCT output value from the filtered DCT values such that the optimal DCT output value is based on the historical demand profiles and the weighting factors; and
distribute energy in one or more batteries in accordance with the optimal DCT output value and current energy demand to minimize energy and demand charges;
wherein the processor is further configured to:
classify the plurality of DCT values into a plurality of sub-categories based on threshold values; and
assign a weighting factor to each of the plurality of DCT values, wherein the weighting factor for each of the plurality of DCT values is different than each other; and
wherein the processor is further configured to:
sub-divide the plurality of DCT values into one of a low-demand category, mid-demand category, and high demand category; and
assign a first weight value for DCT values in the low-demand category, assign a second weight value for DCT values in the mid-demand category, and assign a third weight value for DCT values in the high-demand category, wherein the third weight value is greater than the first weight value and less than the second weight value.

3. A non-transitory computer readable storage medium comprising a computer readable program for minimizing demand charges, wherein the computer readable program when executed on a computer causes the computer to perform a method for minimizing demand charges, the method comprising:

generating historical demand profiles having a plurality of demand charge threshold (DCT) values over a period of time;

filtering the DCT values using weighting factors to provide filtered DCT values such that DCT underestimations and overestimations are removed from optimization;

determining an optimal DCT output value from the filtered DCT values such that the optimal DCT output value is based on the historical demand profiles and the weighting factors; and distributing energy in one or more batteries in accordance with the optimal DCT output value and current energy demand to minimize energy and demand charges;

wherein filtering the DCT values includes:
classifying the plurality of DCT values into a plurality of sub-categories based on threshold values; and
assigning a weighting factor to each of the plurality of DCT values, wherein the weighting factor for each of the plurality of DCT values is different than each other; and wherein classifying the plurality of DCT values includes sub-dividing the plurality of DCT values into one of a low-demand category, mid-demand category, and high demand category; and assigning a weighting factor includes assigning a first weight value for DCT values in the low-demand category, assigning a second weight value for DCT values in the mid-demand category, and assigning a third weight value for DCT values in the high-demand category, wherein the third weight value is greater than the first weight value and less than the second weight value.

* * * * *